United States Patent
Bering

(10) Patent No.: US 11,807,251 B2
(45) Date of Patent: Nov. 7, 2023

(54) HAZARD PREDICTION FOR TRACKED VEHICLES

(71) Applicant: Deere & Company, Moline, IL (US)

(72) Inventor: Christopher Bering, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 529 days.

(21) Appl. No.: 16/986,425

(22) Filed: Aug. 6, 2020

(65) Prior Publication Data

US 2022/0041171 A1 Feb. 10, 2022

(51) Int. Cl.
*B60W 40/13* (2012.01)
*B60W 40/02* (2006.01)
*B60W 50/14* (2020.01)
*B62D 55/06* (2006.01)
*B60W 40/105* (2012.01)

(52) U.S. Cl.
CPC ............ *B60W 40/13* (2013.01); *B60W 40/02* (2013.01); *B60W 40/105* (2013.01); *B60W 50/14* (2013.01); *B62D 55/06* (2013.01); *B60W 2300/44* (2013.01)

(58) Field of Classification Search
CPC .... B60W 40/13; B60W 40/02; B60W 40/105; B60W 50/14; B60W 2300/44; B62D 55/06
USPC .......................................................... 701/19
See application file for complete search history.

(56) References Cited

U.S. PATENT DOCUMENTS

| | | | |
|---|---|---|---|
| 4,627,013 A * | 12/1986 | Ichiyama | E02F 9/264 177/25.14 |
| 9,989,976 B2 | 6/2018 | Garvin et al. | |
| 10,017,035 B2 | 7/2018 | Vik et al. | |
| 10,464,419 B2 | 11/2019 | Vik et al. | |
| 10,520,955 B2 | 12/2019 | Garvin et al. | |
| 2002/0017765 A1 * | 2/2002 | Mallette | B62J 35/00 180/182 |
| 2008/0169131 A1 * | 7/2008 | Takeda | G01G 19/10 177/136 |

(Continued)

FOREIGN PATENT DOCUMENTS

DE 102017126133 A1 5/2019
WO 2017000068 A1 1/2017

OTHER PUBLICATIONS

German Search Report issued in application No. DE102021116624.1, dated Mar. 22, 2022, 9 pages.

*Primary Examiner* — Krishnan Ramesh
(74) *Attorney, Agent, or Firm* — Taft Stettinius & Hollister LLP; Stephen F. Rost

(57) ABSTRACT

An exemplary method generally involves determining a hazard parameter for a tracked vehicle including a ground interface assembly. The ground interface assembly generally includes a track and a drive wheel operable to move the track to thereby propel the tracked vehicle. A load sensor senses a load carried by the tracked vehicle, and a speed sensor senses a vehicle speed of the tracked vehicle. A control system in communication with the load sensor, the speed sensor, and a temperature sensor determines the hazard parameter based upon the load, the vehicle speed, and an ambient temperature in a vicinity of the tracked vehicle. The control system compares the hazard parameter to a threshold parameter, and performs an action based upon the comparison.

16 Claims, 7 Drawing Sheets

(56) References Cited

U.S. PATENT DOCUMENTS

| | | | |
|---|---|---|---|
| 2012/0083942 A1* | 4/2012 | Gunaratne | B60W 40/09 703/2 |
| 2016/0010955 A1* | 1/2016 | Backström | F41H 11/00 701/36 |
| 2016/0171862 A1* | 6/2016 | Das | G08B 21/02 340/686.1 |
| 2017/0087987 A1 | 3/2017 | Vik et al. | |
| 2017/0177011 A1 | 6/2017 | Garvin et al. | |
| 2017/0240046 A1 | 8/2017 | Vik et al. | |
| 2018/0043949 A1* | 2/2018 | Boily | G07C 5/0825 |
| 2018/0093724 A1 | 4/2018 | Boily | |
| 2018/0190045 A1* | 7/2018 | Richard | B62D 55/14 |
| 2018/0265145 A1 | 9/2018 | Todd et al. | |
| 2019/0200522 A1* | 7/2019 | Hansen | A01F 12/58 |
| 2019/0351899 A1* | 11/2019 | Adam | B60W 50/0097 |
| 2020/0042023 A1 | 2/2020 | Garvin et al. | |
| 2021/0173399 A1* | 6/2021 | Richard | B60W 40/12 |

\* cited by examiner

HAZARD PREDICTION FOR TRACKED VEHICLES

TECHNICAL FIELD

The present disclosure generally relates to tracked vehicles, and more particularly but not exclusively relates to systems and methods for determining a hazard parameter for such a tracked vehicle.

BACKGROUND

Tracked vehicles are often used in the agricultural and construction industries in a variety of applications. One issue that can arise with the use of such tracked vehicles is undesirably high temperatures of the tracks, which can lead to damage of the track and/or the vehicle itself. These issues generally arise when the vehicle is bearing a significant load and/or traveling at a relatively high rate of speed, such as during transport across pavement. However, directly measuring the temperature of the track can be difficult for numerous reasons, including the fact that the track is typically moving when the vehicle is in use. For these reasons among others, there remains a need for further improvements in this technological field.

SUMMARY

An exemplary method generally involves determining a hazard parameter for a tracked vehicle including a ground interface assembly. The ground interface assembly generally includes a track and a drive wheel operable to move the track to thereby propel the tracked vehicle. A load sensor senses a load carried by the tracked vehicle, and a speed sensor senses a vehicle speed of the tracked vehicle. A control system in communication with the load sensor, the speed sensor, and a temperature sensor determines the hazard parameter based upon the load, the vehicle speed, and an ambient temperature in a vicinity of the tracked vehicle. The control system compares the hazard parameter to a threshold parameter, and performs an action based upon the comparison. Further embodiments, forms, features, and aspects of the present application shall become apparent from the description and figures provided herewith.

DETAILED DESCRIPTION OF ILLUSTRATIVE EMBODIMENTS

Figure 1:
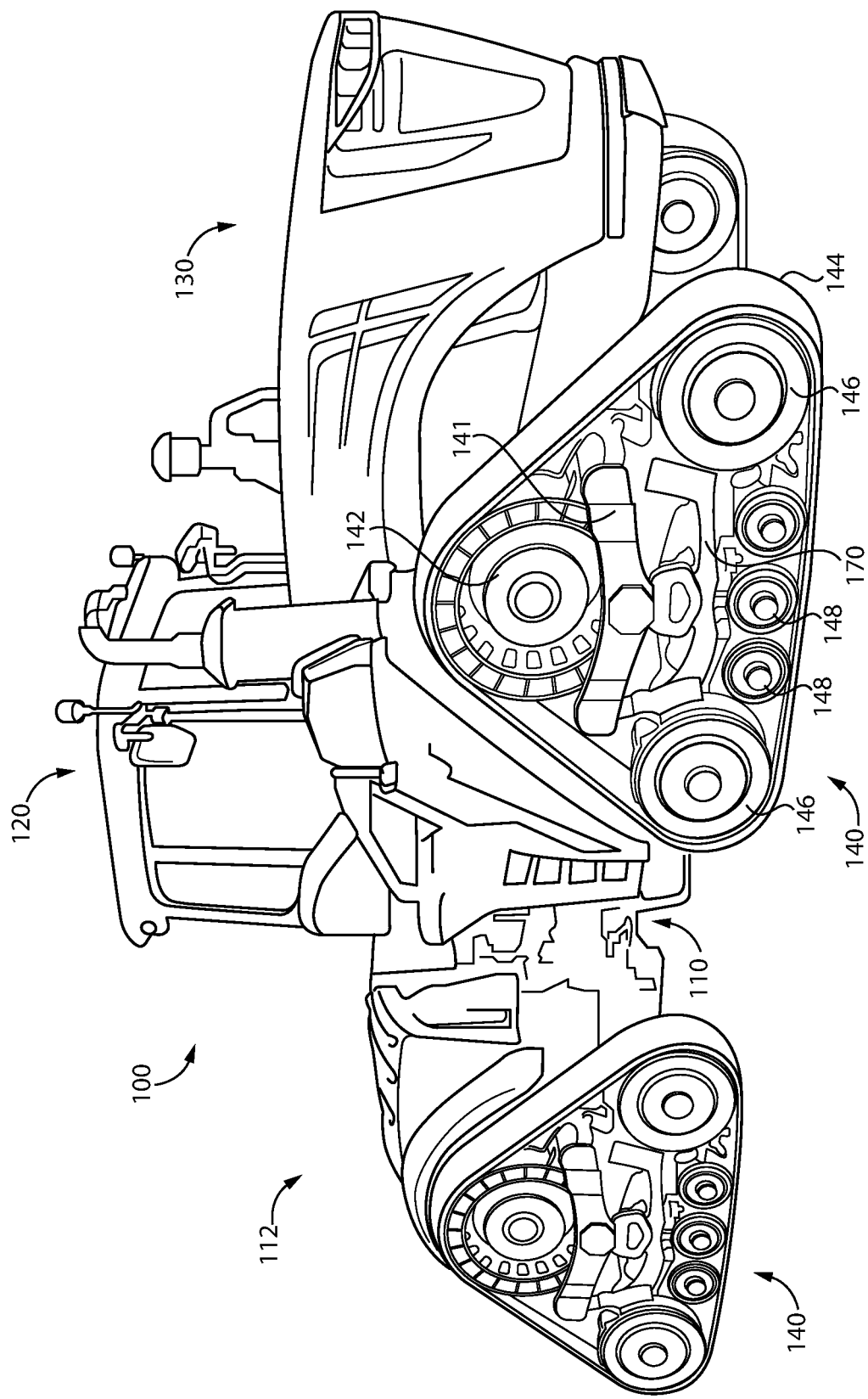
FIG. 1 is a perspective illustration of a tracked vehicle according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 2:
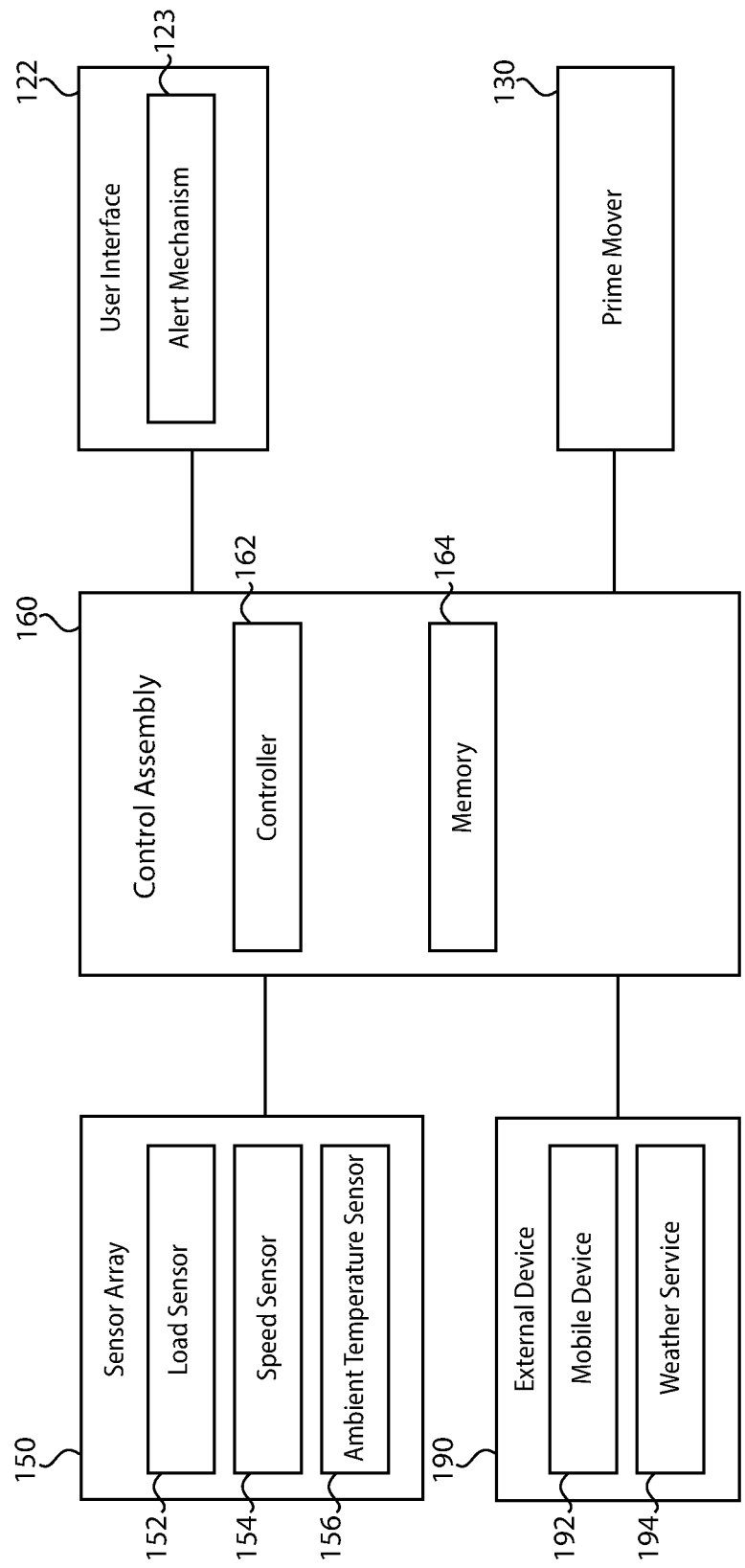
FIG. 2 is a schematic block diagram of a portion of the tracked vehicle.

With reference to FIG. 1, illustrated therein is a tracked vehicle 100 according to certain embodiments. The tracked vehicle 100 generally includes a chassis 110, a cab 120 mounted to the chassis 110, a prime mover 130 mounted to the chassis 110, and at least one ground interface assembly 140 operably connected with the prime mover 130 such that the prime mover 130 is operable to drive the ground interface assembly 140 to propel the vehicle 100. With additional reference to FIG. 2, the tracked vehicle 100 further includes a sensor array 150 and a control system 160 in communication with the sensor array 150.

The chassis 110 provides the main body of the vehicle 100, and supports various components of the vehicle 100, such as the cab 120 and the prime mover 130. The chassis 110 includes attachment points 112 for connecting the tractor to its intended load or implement.

The cab 120 is mounted to the chassis 110, and provides a space for an operator or other user to sit or stand during operation of the vehicle 100. The cab 120 may include a user interface 122 by which the operator may control the vehicle 100 and/or monitor various aspects of the operation of the vehicle 100. It is also contemplated that the cab 120 may be omitted, for example in embodiments in which the vehicle 100 is autonomous or remotely controlled. In such forms, the user interface 122 may be positioned in a location other than on the vehicle 100. For example, should the vehicle 100 be remotely controlled, the user interface 122 may be provided at the remote location from which the vehicle 100 is controlled. As described herein, the user interface 122 may include an alert mechanism 123 operable to provide an audible and/or visible alert to the user when the speed of the vehicle 100 exceeds a threshold speed.

The prime mover 130 is mounted to the chassis 110, and is operable to power the ground interface assembly 140 to propel the vehicle 100. In certain embodiments, the prime mover 130 may comprise an engine, such as an internal combustion engine. In certain embodiments, the prime mover 130 may comprise an electric motor. Regardless of the precise form of the prime mover 130, the prime mover 130 may be operable to generate a rotary output for use by the ground interface assembly 140. As should be appreciated, in certain embodiments, the prime mover 130 may be connected with the ground interface assembly or assemblies 140 via a transmission assembly or other components known to those skilled in the art.

Figure 3:
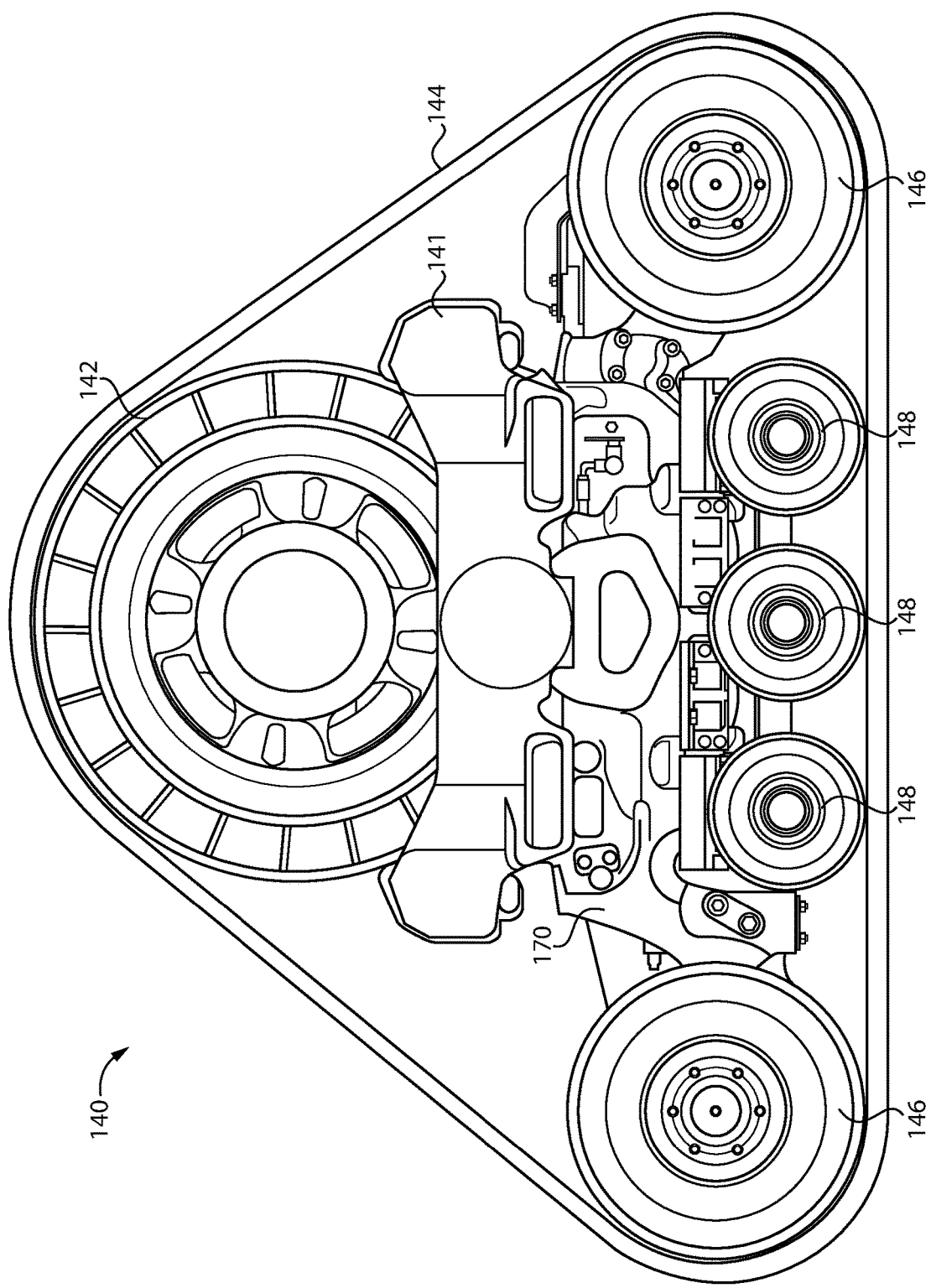
FIG. 3 is a plan view of a ground interface assembly of the tracked vehicle.

With additional reference to FIG. 3, the ground interface assembly 140 generally includes an undercarriage 141 coupled with the chassis 110, a drive wheel 142 movably mounted to the chassis 110 via an axle, and a track 144 engaged with the drive wheel 142. While the illustrated vehicle 100 includes four instances of the ground interface assembly 140, it is also contemplated that more or fewer ground interface assemblies 140 may be utilized. The drive wheel 142 is operably connected with the prime mover 130 (e.g., via a transmission) such that the prime mover 130 is operable to rotate the drive wheel 142 to move the track 144 for propulsion of the vehicle 100. While other forms are contemplated, the illustrated ground interface assembly 140 further includes a pair of additional wheels 146 that are offset from one another and the drive wheel 142, and the track 144 is wrapped around the drive wheel 142 and the additional wheels 146 in a generally triangular shape. The illustrated ground interface assembly 140 further includes one or more mid-rollers 148, each of which is movably mounted to the undercarriage 141 via a mid-roller carrier 170. As described herein, the mid-roller carrier 170 comprises a movable component having a deflection that corresponds to a load of the vehicle 100, and the load being borne by the vehicle 100 can be determined based upon such deflection of the movable component.

The sensor array 150 generally includes a load sensor 152 operable to sense a load carried by the vehicle 100, and may further include a speed sensor 154 operable to sense a speed of the vehicle 100 and/or an ambient temperature sensor 156 operable to sense the ambient temperature in the vicinity of the vehicle 100. The load sensor 152 is operable to sense a load of the vehicle 100, for example by sensing deflection of a movable component whose deflection corresponds to the vehicle load. Certain illustrative embodiments of the load sensor 152 are provided below with reference to FIGS. 6 and 7.

In certain embodiments, the sensor array 150 may include a speed sensor 154 operable to sense the vehicle speed of the vehicle 100. In such forms, the speed sensor 154 is operable to sense a speed of the vehicle 100, for example based upon the rotational speed of one or more drive wheels 142 and/or one or more additional wheels 146. The speed sensor 154 may, for example, be provided in the form of a speedometer of the vehicle 100. It is also contemplated that the vehicle 100 may not necessarily include the speed sensor 154. As one example, vehicle speed information may be provided by an external device 190, such as a mobile device. For example, the operator of the vehicle 100 may carry a mobile device 192 running an application that determines the speed of the external device based on position information, such as position information generated via the Global Positioning System (GPS).

In certain embodiments, the sensor array 150 may include a temperature sensor 156 operable to sense the ambient temperature in the vicinity of the vehicle 100. In such forms, the temperature sensor 156 may, for example, take the form of a thermocouple, a digital thermometer, or another form of temperature sensor operable to sense the ambient temperature. It is also contemplated that the temperature sensor 156 may be omitted, for example in embodiments in which the control assembly 160 receives temperature data from another source (e.g., an external device 190 in communication with a weather service 194).

The control assembly 160 is in communication with the sensor array 150 such that the control assembly 160 is operable to receive information from the sensor array 150. More particularly, the control assembly 160 is configured to receive load information (such as position information) from the load sensor 152 and vehicle speed information from the speed sensor 154. It is also contemplated that the control assembly 160 may receive the speed information from another source, such as an external device 190 as noted above. The control assembly 160 is also configured to receive ambient temperature information relating to the ambient temperature in the vicinity of the vehicle 100, for example from the ambient temperature sensor 156. It is also contemplated that the control assembly 160 may receive the ambient temperature information from an external source 190, such as a weather service 194. The control assembly 160 may also be in communication with the user interface 122 such that the control assembly 160 is operable to provide user alerts via the user interface 122. Additionally or alternatively, the control assembly 160 may be in communication with the prime mover 130 and operable to control operation of the prime mover 130. The control assembly 160 generally includes a controller 162 and memory 164 connected with the controller 162. Further details regarding an example form for the control assembly 160 are provided below with reference to FIG. 8.

Figure 4:
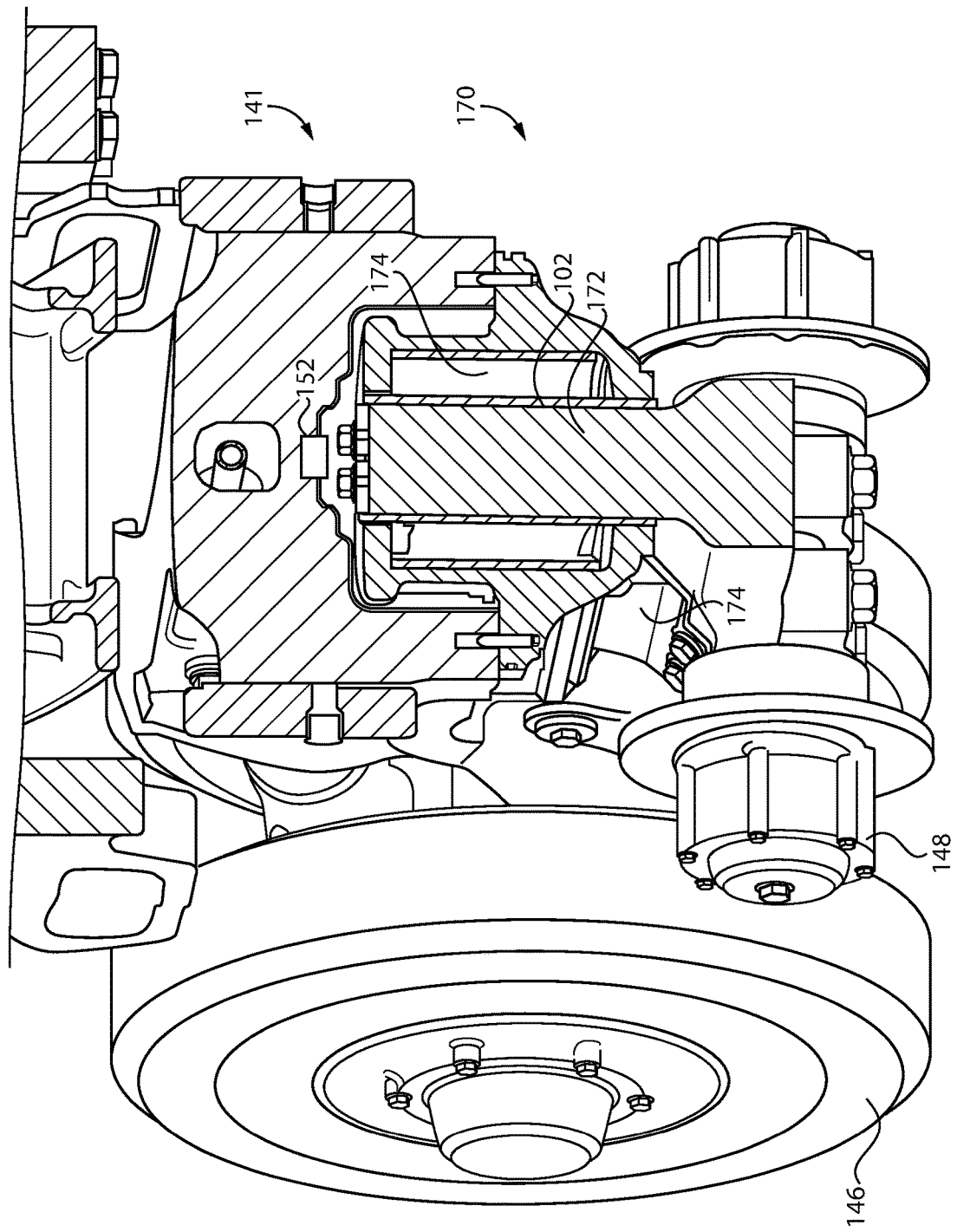
FIG. 4 is a cutaway view of a portion of the ground interface assembly.

With additional reference to FIG. 4, the mid-roller carrier 170 is movably coupled to the undercarriage 141, and supports the mid-rollers 148. The mid-roller carrier 170 comprises a body portion 172 that rotatably supports the mid-rollers 148, for example via one or more axles. The body portion 172 is engaged with the undercarriage 141 via one or more elastic support elements 174 that permit limited vertical movement of the body portion 172 relative to the undercarriage 141. The body portion 172 has a home position when the vehicle 100 is unloaded, and moves to a deflected position as the load borne by the vehicle 100 increases such that the deflection of the body portion 172 corresponds to the load being borne by the vehicle 100. As such, the vehicle load can be determined based upon the deflection of the body portion 172. The body portion 172 of the mid-roller carrier 170 is thus one example of a movable component 102 having a deflection corresponding to the load borne by the vehicle 100. The load sensor 152 may therefore be associated with the body portion 172 such that the control assembly 160 is operable to determine the load borne by the vehicle 100 based upon information generated by the load sensor 152.

Figure 5:
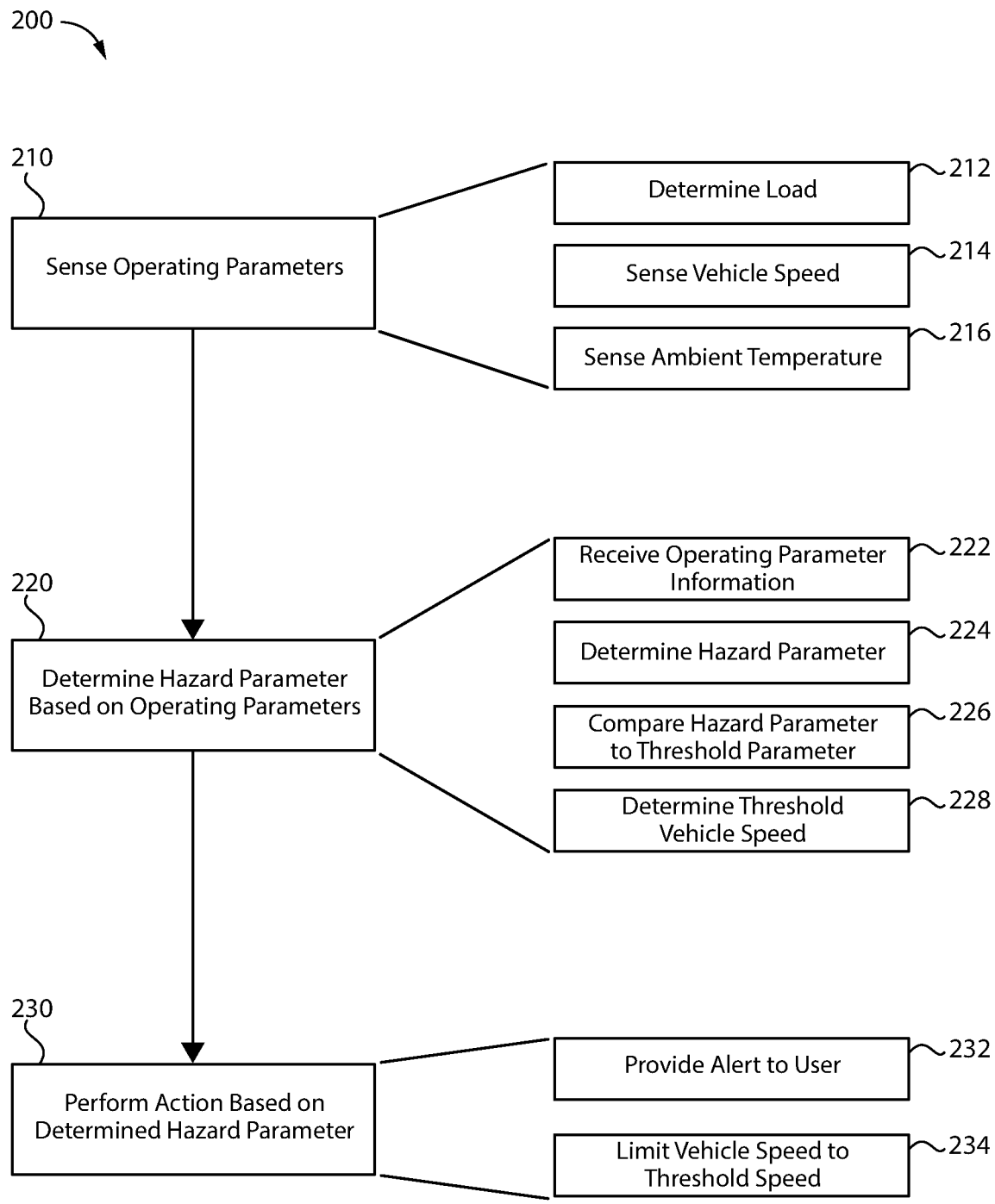
FIG. 5 is a schematic flow diagram of a process according to certain embodiments.

With additional reference to FIG. 5, an exemplary process 200 that may be performed using the tracked vehicle 100 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 200 may be performed wholly by one or more components of the vehicle 100, or that the blocks may be distributed among one or more of the elements and/or additional devices or systems that are not specifically illustrated in FIGS. 1-4. Additionally, while the blocks are illustrated in a relatively serial fashion, it is to be understood that two or more of the blocks may be performed concurrently or in parallel with one another. Moreover, while the process 200 is described herein with specific reference to the tracked vehicle illustrated in FIGS. 1-4, it is to be appreciated that the process 200 may be performed with tracked vehicles having additional or alternative features.

The process 200 generally includes a sensing procedure 210, a determining procedure 220, and an acting procedure 230. As described herein, the sensing procedure 210 generally involves sensing one or more operating parameters relating to operation of the vehicle 100, the determining procedure 220 generally involves determining a hazard parameter based upon the one or more operating parameters, and the acting procedure 230 generally involves taking one or more actions based upon the determined hazard parameter. In certain embodiments, the hazard parameter may be an estimated track temperature of the track 142. It is also contemplated that the hazard parameter may be provided as a hazard score or another variable that varies according to the operating parameters.

As noted above, the sensing procedure 210 generally involves sensing one or more operating parameters relating to operation of the vehicle 100. In the illustrated form, the sensing procedure 210 generally involves sensing each of a load of the tracked vehicle 100, a speed of the tracked vehicle 100, and an ambient temperature in the vicinity of the tracked vehicle 100. As described herein, these operating parameters may be utilized in the determining procedure 220 to determine a hazard parameter (e.g., the temperature of the track 142), which may be utilized as the basis for one or more actions to be performed in the acting procedure 230.

The sensing procedure 210 includes block 212, which generally involves sensing a load of the tracked vehicle 100. Block 212 may, for example, be performed by the control assembly 160 based upon information generated by a load sensor 152 that is associated with a movable component 102 having a deflection corresponding to the load. In the illustrated embodiment, the load sensor 152 is associated with the body 172 of the mid-roller carrier 170, which has a deflection corresponding to the load as noted above. In other embodiments, the load sensor 152 may be associated with another movable component having a deflection corresponding to the load borne by the vehicle 100.

The sensing procedure 210 also includes block 214, which generally involves sensing a speed of the tracked vehicle 100. Block 214 may, for example, be performed by the control assembly 160 based upon information generated by a speed sensor 154 operable to sense the speed of the vehicle 100. In certain embodiments, the speed sensor 154 may be configured to sense the speed of the vehicle 100 based upon the rotational speed of one or more wheels 142, 146, 148 of one or more of the ground interface assemblies 140. In certain embodiments, the speed sensor 154 may include a GPS chip, and the speed of the vehicle 100 may be determined based upon GPS information. It is also contemplated that the speed sensor 154 may sense the speed of the vehicle 100 in any other manner that would be apparent to those of skill in the art.

The sensing procedure 210 may further include block 216, which generally involves sensing an ambient temperature in the vicinity of the vehicle 100. Block 216 may, for example, be performed by the control assembly 160 based upon information generated by an ambient temperature sensor 156 operable to sense the ambient temperature in the vicinity of the vehicle 100. It is also contemplated that block 216 may involve sensing the ambient temperature in another manner. For example, the control assembly 160 may receive current temperature data from an external source 190, such as a weather service that monitors the current temperature.

As noted above, the determining procedure 220 generally involves determining the hazard parameter based upon one or more operating parameters, such as the operating parameters sensed in the sensing procedure 210. This hazard parameter information, and optionally one or more additional parameters determined during the determining procedure 220, may serve as the basis for the actions performed in the acting procedure 230.

The determining procedure 220 may begin with block 222, which generally involves receiving information related to one or more operating parameters of the tracked vehicle 100. Block 222 may, for example, involve the control assembly 160 receiving information related to the operating parameters from the sensor array 150 and/or an external device 190. For example, the control assembly 160 may receive load information from the load sensor 152, speed information from the speed sensor 154, and ambient temperature information from the ambient temperature sensor 156. As noted above, the speed sensor 154 and/or the temperature sensor 156 may, in certain embodiments, be provided in an external device 190 (e.g., a mobile device 192). In certain embodiments, the control assembly 160 may be provided with one or more parameters in advance of the process 200. For example, the memory 164 may have stored thereon information relating to the make and model of the tracked vehicle 100 and/or information relating to one or more characteristics of the track 144, such as width, thickness and/or material. As described herein, the memory 164 may further have stored thereon a previous hazard parameter (e.g., a hazard parameter calculated in a prior iteration of the determining procedure 220).

The determining procedure 220 further includes block 224, which generally involves determining a hazard parameter based upon a plurality of operating parameters, including the operating parameters received in block 222 (e.g., from the sensor array 150 and/or the external device 190) and optionally one or more parameters received from memory 164 in block 222. In certain embodiments, the memory 164 may have stored thereon empirically-derived relationship information (e.g., equations, models, and/or look-up tables) relating the hazard parameter (e.g., track temperature) to vehicle loads, vehicle speeds, and ambient temperature. For example, the relationship information may include a look-up table including a plurality of independent variables (e.g., load, vehicle speed, ambient temperature, operating time, vehicle model, ground condition, ground temperature, track material, track width, and/or other operating parameters) and one or more dependent variables (e.g., hazard parameter and/or maximum acceptable speed).

As one simple example, should the hazard parameter be an estimated track temperature of the track 142, the relationship information stored in memory 164 may include information indicating that when the ambient temperature is 70° F. and the vehicle has been moving at 20 mph for ten minutes with a load of ten tons, the track temperature is 150° F. If the information received in block 222 indicates that the ambient temperature is 70° F. and the vehicle 100 has been moving at 20 mph for ten minutes with a load of ten tons, then block 224 would involve determining the current temperature of the track 144 as 150° F. As will be appreciated, the determining of block 224 may involve various statistical analysis techniques known to those skilled in the art, such as analysis of variance (ANOVA), interpolation, extrapolation, etc. For example, should the relationship information not include a data point for the load value received in block 222, block 224 may involve interpolating the hazard parameter based upon a first data point related to a load lower than the current load value and a second data point related to a load higher than the current load value.

As another simple example, the relationship information stored in memory 164 may include an equation in which operating parameters corresponding to those received in block 222 are independent variables and the hazard parameter is a dependent variable. In such a form, block 224 may involve calculating the current hazard parameter based upon the current values of the operating parameters as received in block 222.

With the hazard parameter calculated, the process 200 may proceed to block 226, which generally involves comparing the hazard parameter to a threshold parameter. For example, block 226 may involve comparing the hazard parameter to a predetermined threshold parameter stored in memory 164. The threshold parameter may, for example, be a value of the hazard parameter at which the vehicle can operate without significant risk of heat-induced failure. As one particular example, in embodiments in which the hazard parameter corresponds to track temperature, block 226 may involve comparing the estimated track temperature to a predetermined threshold temperature stored in memory 164. The threshold temperature is less than the failure temperature of the track 144, and may, for example, be a temperature at which the track 144 can operate without significant risk of heat-induced failure.

In certain embodiments, the determining procedure 220 may include block 228, which generally involves determining a threshold speed for the vehicle 100. For example, block 228 may involve determining a speed at which the vehicle 100 may operate without exceeding the threshold parameter. Those skilled in the art will readily appreciate that such a threshold speed may be derived from the relationship information in a manner analogous to that in which the hazard parameter is calculated in block 224.

As noted above, the acting procedure 230 generally involves performing one or more actions based upon the comparison of the hazard parameter with the threshold parameter. For example, the process 200 may continue to the acting procedure 230 in the event that the hazard parameter violates the threshold parameter. In certain embodiments, a low hazard parameter may correspond to a low risk of hazard, and the hazard parameter may violate the threshold parameter when the hazard parameter exceeds the threshold parameter. In certain embodiments, a high hazard parameter may correspond to a low risk of hazard, and the hazard parameter may violate the threshold parameter when the hazard parameter falls below the threshold parameter.

In certain embodiments, the acting procedure 230 may include block 232, which generally involves providing an alert to the user. Block 232 may, for example, involve transmitting an alert signal from the control assembly to the user interface 122 and/or an external device 190 (e.g., the mobile device 192 of the user). In response to receiving the alert signal, the user interface 122 and/or the external device 190 may provide at least one of an audible alert or a visible alert to the user. In certain embodiments, the alert may be provided as a flashing light and/or a buzzer. In certain embodiments, the alert may convey to the user information (e.g., spoken and/or displayed information) indicating that the current operating conditions present a higher than usual risk of failure and/or damage to the vehicle 100. For example, the alert may include information that the track temperature exceeds the threshold temperature, that the current speed exceeds the threshold speed, or simply that continuing to operate at the current conditions may result in damage to the vehicle.

In certain embodiments, the acting procedure 230 may include block 234, which generally involves reducing the speed of the vehicle 100 and/or limiting the speed of the vehicle 100 to the threshold speed. For example, in embodiments in which the control assembly 160 is in communication with the prime mover 130, the control assembly 160 may override the user's control with a deceleration command that causes the prime mover 130 to reduce the speed of the vehicle 100. In certain embodiments, the threshold speed need not be calculated in block 228, and the control assembly 160 may simply reduce the speed of the vehicle 100 in response to the hazard parameter violating the threshold parameter. Should the hazard parameter continue to exceed the threshold parameter in a subsequent iteration of the determining procedure, the process 200 may involve again reducing the vehicle speed in a corresponding iteration of the acting procedure 230.

As will be appreciated, the process 200 may be performed continuously, continually, or intermittently to monitor the hazard parameter (e.g., the temperature of the track 144) during operation of the vehicle 100. In certain embodiments, the hazard parameter determined in one iteration of the process 200 may be utilized as an operating parameter for a subsequent iteration of the process 200.

Figure 6:
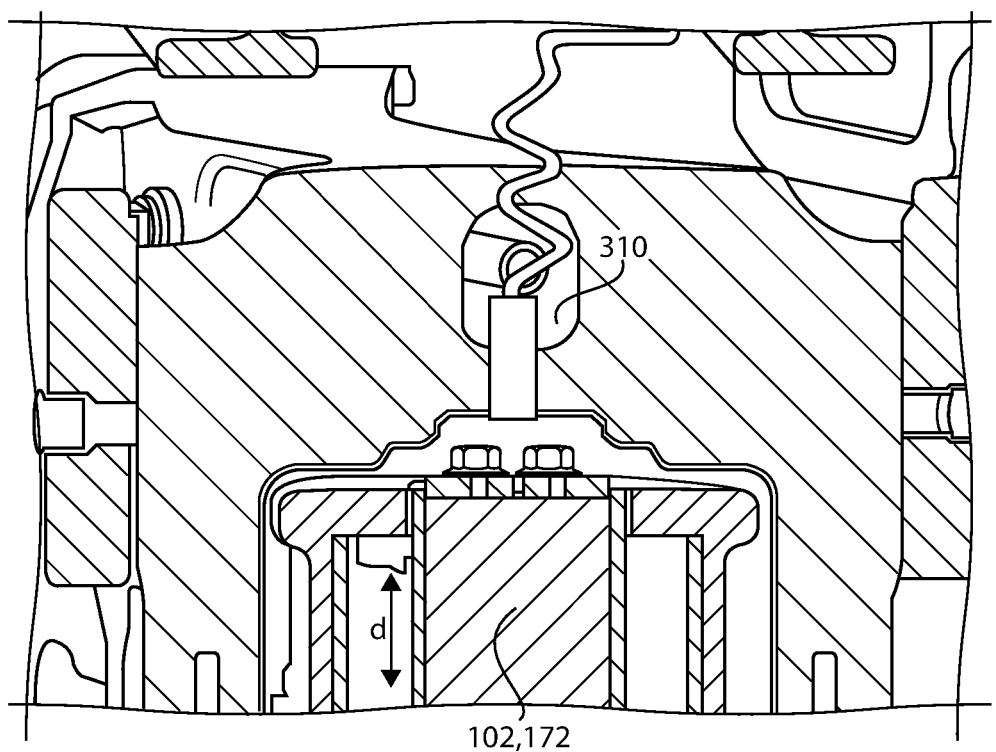
FIG. 6 is a cutaway view of the ground interface assembly and a load sensor according to certain embodiments.

With additional reference to FIG. 6, illustrated therein is a contactless load sensor 310 according to certain embodiments. In certain forms, the load sensor 152 may, for example, be provided in the form of the load sensor 310. The load sensor 310 is configured to sense the displacement d of the movable component 102, which in the illustrated form is provided as the body 172 of the mid-roller carrier 170. More particularly, the contactless load sensor 310 is configured to sense the displacement d of the movable component 102, 172 without contacting the movable component 102, 172. In certain embodiments, the contactless load sensor 310 may be provided in the form of an inductive position sensor. In certain embodiments, the contactless load sensor 310 may be provided in the form of a laser-based position sensor. As will be appreciated, the control system 160 may have stored in memory 162 information (e.g., one or more look-up tables and/or equations) relating the output of the contactless load sensor 310 to the load being borne by the vehicle 100.

Figure 7:
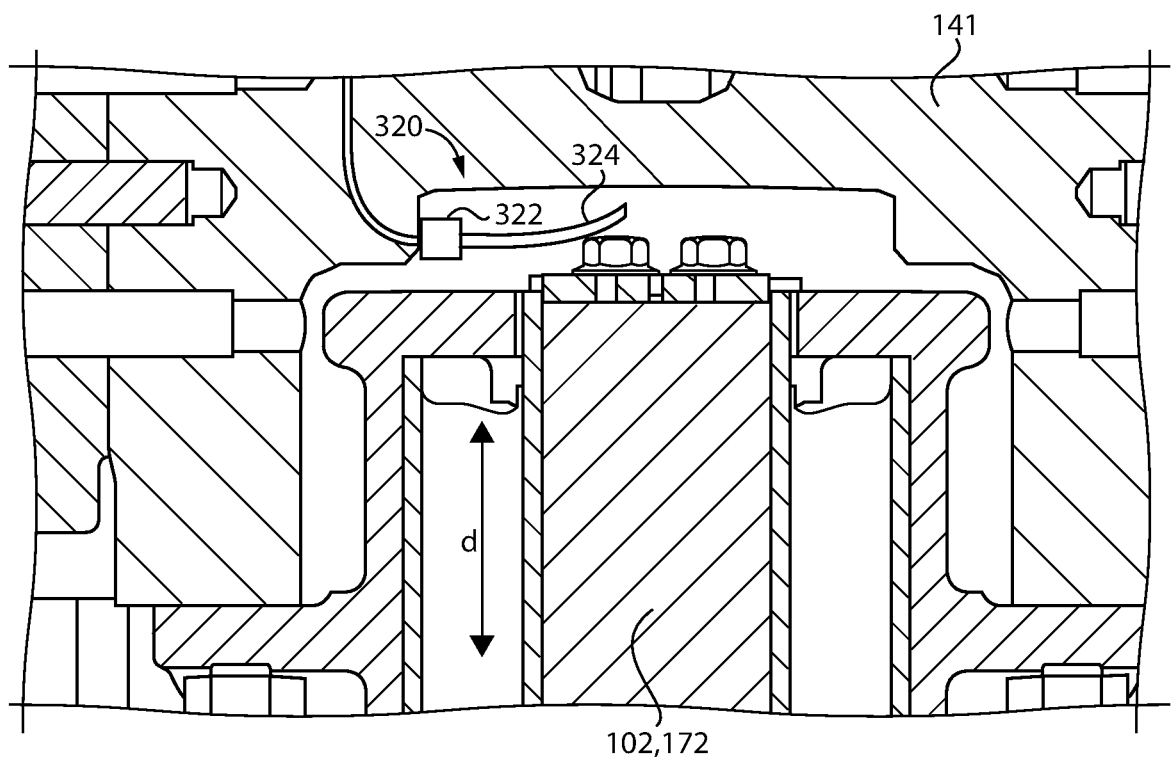
FIG. 7 is a cutaway view of the ground interface assembly and a load sensor according to certain embodiments.

With additional reference to FIG. 7, illustrated therein is a contact-based load sensor 320 according to certain embodiments. In certain forms, the load sensor 152 may, for example, be provided in the form of the load sensor 320. The load sensor 320 is configured to sense the displacement d of the movable component 102, which in the illustrated form is provided as the body 172 of the mid-roller carrier 170. More particularly, the contact-based load sensor 320 is configured to sense the displacement d by contacting the movable component 102, 172. In the illustrated form, the load sensor 320 is provided as a strain gauge including a body portion 322 mounted to the undercarriage 141 and an armature 324 extending from the body portion 322 and into contact with the movable component 102, 172. Those skilled in the art will readily appreciate that as the displacement d changes, the armature 324 flexes relative to the body portion 322, thereby altering the output of the load sensor 320. As with the contactless load sensor 310, the control system 160 may have stored in memory 162 information (e.g., one or more look-up tables and/or equations) relating the output of the contact-based load sensor 320 to the load being borne by the vehicle 100.

Figure 8:
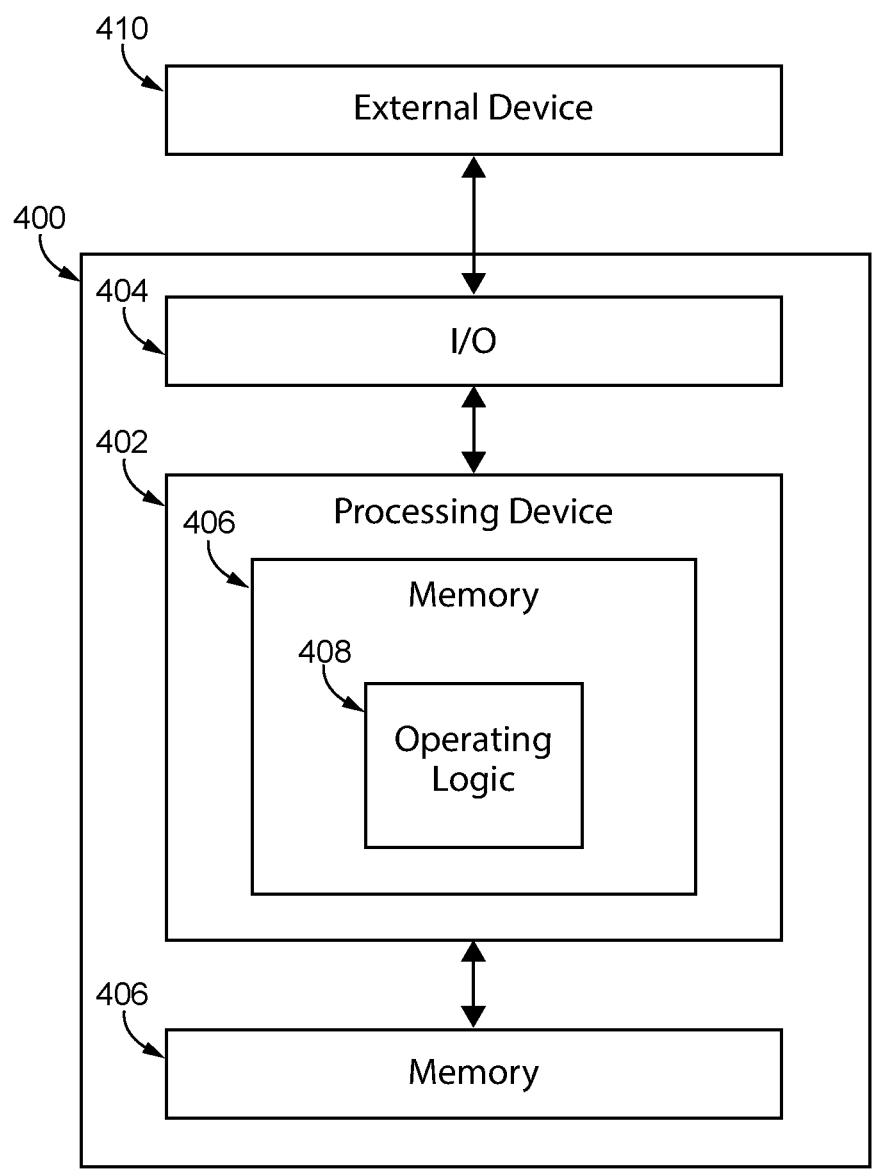
FIG. 8 is a schematic block diagram of a computing device that may be utilized in certain embodiments.

Referring now to FIG. 8, a simplified block diagram of at least one embodiment of a computing device 400 is shown. The illustrative computing device 400 depicts at least one embodiment of a control system that may be utilized in connection with the control system 160 illustrated in FIG. 2.

Depending on the particular embodiment, the computing device 400 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, control panel, processing system, on-board control unit, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as the user interface 122, the prime mover 130, the sensor array 150, or the external device 190. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is of a programmable variety that executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable variety, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As illustrated, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 8, it should be appreciated that a particular computing device 400 may include multiple processing devices 402, I/O devices 404, and/or memories 406 in other embodiments. Further, in some embodiments, more than one external device 410 may be in communication with the computing device 400.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   providing a tracked vehicle comprising a ground interface assembly, wherein the ground interface assembly comprises:
   a chassis;
   an undercarriage frame coupled with the chassis;
   a mid-roller carrier movably mounted to the undercarriage frame, the mid-roller carrier comprising a movable component; and
   one or more support elements arranged to engage the undercarriage frame and the movable component, wherein the one or more support elements permit limited movement of the movable component relative to the undercarriage;
   sensing, by a load sensor, a load carried by a tracked vehicle comprising the ground interface assembly, the ground interface assembly comprising a track and a drive wheel operable to move the track to thereby propel the tracked vehicle, wherein the movable component has a displacement corresponding to the load, wherein sensing the load comprises sensing the displacement of the movable component;
   sensing, by a speed sensor, a vehicle speed of the tracked vehicle;
   determining, by a control system in communication with the load sensor, the speed sensor, and a temperature sensor, a hazard parameter based upon the load, the vehicle speed, and an ambient temperature in a vicinity of the tracked vehicle;
   comparing, by the control system, the hazard parameter to a threshold parameter; and
   performing, by the control system, an action based upon the comparison of the hazard parameter with the threshold parameter.

2. The method of claim 1, wherein the action is performed in response to the hazard parameter violating the threshold parameter.

3. The method of claim 1, wherein the control system has stored in memory at least one characteristic of the track, and wherein the determining is based further upon the at least one characteristic of the track.

4. The method of claim 1, wherein the hazard parameter is an estimated track temperature;
   wherein the threshold parameter is a threshold temperature; and
   wherein the action is performed in response to the estimated track temperature exceeding the threshold temperature.

5. The method of claim 1, wherein the hazard parameter is a current hazard parameter, and wherein the determining is further based upon a prior hazard parameter determined in a prior iteration of the determining.

6. The method of claim 1, wherein the tracked vehicle further comprises a cab in which a user is seated; and
   wherein the action comprises providing an alert to the user via a user interface positioned within the cab.

7. The method of claim 1, further comprising determining, by the control system, a threshold speed at which the hazard parameter will not exceed the threshold parameter; and
   wherein the action comprises limiting the vehicle speed to the threshold speed.

8. The method of claim 1, wherein the control system has stored in memory relationship information relating hazard parameter data to load data, vehicle speed data, and ambient temperature data; and
   wherein the determining is further based upon the relationship information.

9. The method of claim 8, further comprising determining, by the control system, a threshold speed at which the hazard parameter will not exceed the threshold parameter, wherein the determining of the threshold speed is based upon the load, the ambient temperature, and the relationship information.

10. The method of claim 1, further comprising sensing, by a temperature sensor of the tracked vehicle, the ambient temperature.

11. A tracked vehicle, comprising:
a chassis;
a prime mover mounted to the chassis;
a ground interface assembly comprising:
    a drive wheel operably connected with the prime mover such that the prime mover is operable to rotate the drive wheel;
    a track engaged with the drive wheel such that the drive wheel is operable to move the track to propel the tracked vehicle;
    an undercarriage frame coupled with the chassis;
    a mid-roller carrier movably mounted to the undercarriage frame, the mid-roller carrier comprising a movable component having a displacement corresponding to a load carried by the tracked vehicle; and
    one or more support elements arranged to engage the undercarriage frame and the movable component, wherein the one or more support elements permit limited movement of the movable component relative to the undercarriage;
a sensor array comprising:
    a displacement sensor operable to sense the displacement of the movable component; and
    a speed sensor operable to sense a vehicle speed of the tracked vehicle; and
a control system in communication with the sensor array, wherein the control system is configured to:
    determine a hazard parameter based upon the displacement, the vehicle speed, and an ambient temperature in a vicinity of the tracked vehicle;
    compare the hazard parameter to a threshold parameter; and
    perform an action based upon the comparison of the hazard parameter with the threshold parameter.

12. The tracked vehicle of claim 11, wherein the sensor array further comprises a temperature sensor operable to sense the ambient temperature.

13. The tracked vehicle of claim 11, wherein the control assembly is further configured to:
    determine a load of the tracked vehicle based upon the displacement; and
    determine the hazard parameter based in part upon the load.

14. The tracked vehicle of claim 11, wherein the load sensor comprises an inductive position sensor.

15. The tracked vehicle of claim 11, wherein the load sensor comprises a strain gauge.

16. The tracked vehicle of claim 11, wherein the hazard parameter is an estimated track temperature of the track;
    wherein the threshold parameter is a threshold track temperature; and
    wherein the action is performed in response to the estimated track temperature exceeding the threshold track temperature.

* * * * *